3,245,946
RUBBER AND PLASTIC FORMULATIONS
AND PROCESS
Francis M. O'Connor, Kenmore, Tudor L. Thomas, Snyder, and Francis K. Boyle, Tonawanda, N.Y., assignors to Union Carbide Corporation, a corporation of New York
No Drawing. Filed Apr. 29, 1959, Ser. No. 809,604
16 Claims. (Cl. 260—41)

The present invention relates to noncellular rubber or plastic formulations containing an activated zeolitic molecular sieve material for adsorbing residual substances.

In the processing and storage of natural and synthetic polymers including such materials as natural and synthetic rubbers, plastics, resins, and adhesives, much difficulty is encountered due to the presence in these materials of minor amounts of deleterious substances. Among the undesirable substances which tend to downgrade the final product, or which pose manufacturing difficulties, are HCl, $H_2S$ and residual moisture. For example, in accordance with the usual compounding and molding techniques, these materials at certain elevated temperatures will form gases and vapors which, on expanding within the rubber or plastic material form pits and voids.

When moisture is present in formulations of, for instance, neoprene rubber, there are several reasons why such moisture acts to the detriment of the final rubber compound and also to the processing thereof. For instance, when the formulation is provided with pyrocatechol retained within a molecular sieve carrier to act as a latent curing accelerator, it has been noted that the full benefit of the latent curing effect has often been limited by premature release of the pyrocatechol. Ordinarily, the pyrocatechol is retained within the molecular sieve pores for a sufficient time to deter any curing action until a particular desired temperature is attained; at which point in the process, the retained pyrocatechol is released to function in its normal manner.

When in such processes, however, residual water is present in the formulation, there is a tendency for the water molecule to be preferentially adsorbed by the pyrocatechol-loaded sieve, thereby effecting at least a partial displacement and release of the curing agent. As is shown by the data hereinbelow, release of the active agent under these conditions results in a premature initiation of the curing (vulcanization) reaction. The end result is that insufficient time is available for the completion of the various shaping operations that may be required for the neoprene product. A similar deleterious effect is observed for other types of rubber formulations.

Much the same problem is encountered when rubber or plastic compounds are placed in storage, i.e., moisture present in such compounds will foster the release of an active agent which has been retained in a molecular sieve. Also, in applications such as frictioning, wherein a rubber composition is distributed onto or into fabric used in the manufacture of belting, there will be cavities or blisters formed in the belt when it is vulcanized, unless all residual water is completely removed from the compound.

It is therefore an object of the present invention to provide a means for counteracting the harmful effect which results from the formation of gases and vapors in noncellular rubber, plastic and resin formulations at elevated temperatures.

A further object is to provide a method for adsorbing residual deleterious substances from rubber and plastic formulations during the processing and storage thereof.

Another object is to provide an improved rubber formulation exhibiting such favorable characteristics as improved scorch time.

It is also an object to provide an improved rubber formulation containing a latent curing agent in combination with a highly effective adsorbent material.

In brief, the invention contemplates a method for counteracting the effects of contained moisture and other materials contained in, and adversely effecting rubber, plastic and resin formulations by including in such formulations an activated, synthetic or naturally occurring crystalline zeolitic molecular sieve as an adsorbent agent. A preferred form of the invention resides in the synergistic effect derived from the use of the activated adsorbent agent, which functions in conjunction with a molecular sieve containing a curing agent, curing accelerator or catalyst, etc., also present in the formulation.

In accordance with this invention, it has also been found that molecular sieve adsorbents when incorporated into certain resin systems are useful in retarding the degradation of the product in storage and/or service by adsorbing and withholding substances such as $H_2S$, $CO_2$, HCl, $NH_3$, etc., evolved by degradation due to action of heat, light and chemical attack; thus, the adsorbed substance is prevented from promoting further degradation of the system.

The structure and properties of synthetic three-dimensional crystalline zeolitic molecular sieves are described in several publications; for example, Breck et al., Jour. Am. Chem. Soc., 78, 2338 (1956), Breck et al., Jour. Am. Chem. Soc., 78, 5963 (1956), and Reed et al., Jour. Am. Chem. Soc., 78, 5972 (1956), and in U.S. Patent #2,882,243 (zeolite A).

The synthetic and natural zeolitic materials hereinafter referred to may be generally described as metal aluminosilicates having a three-dimensional structure defining internal pores which are of varying sizes depending on the particular materials used. The synthetic and natural species are clearly distinguishable by their chemical composition and their crystalline structure as determined by X-ray diffraction patterns.

Crystalline zeolitic molecular sieves, both natural and synthetic, have unique adsorptive properties both as to selectivity and capacity. Their particular crystalline structures offer large surface areas for adsorption and their controlled pore sizes also allow an adsorptive selectivity based primarily on the size of molecules being treated. That is, a particular pore size molecular sieve will only adsorb molecules sufficiently small to enter the pores and will exclude all molecules of a larger size.

The preparation of these molecular sieve materials, whether synthetic or naturally occurring, for service as adsorptive agents requires an activating process. In effect, this means that a substantial portion or all of the water normally present as water of hydration is driven from the molecular sieve thereby rendering the pores susceptible to adsorption of either water or other materials. As has been mentioned previously, the zeolites have a much greater propensity to receive water molecules in preference to other molecules, and under certain conditions the water will dislodge a material already retained within the sieve pores.

Reference is made hereinabove to molecular sieves into whose pores an active chemical agent has been adsorbed for a particular purpose. For instance, an improved neoprene rubber processing method is attained by adding to the rubber formulation a latent curing agent such as a crystalline zeolitic molecular sieve containing pyrocatechol.

To briefly explain the essential function of a chemical-loaded molecular sieve, for example, in a curable rubber or plastic formulation, the technique allows the use of very active compounds to obtain fast cures, without sacrificing processing safety, this characteristic being directly related to the material's "scorch" or premature cure time. It is generally necessary to provide a given amount of processing time, and the cure rate obtained with that system must be accepted. Curing aids in the form of an active agent retained in a molecular sieve, will allow these active agents to be held relatively inactive in the adsorbed state at ambient or processing temperatures. Then, during the curing operation, the active compound can be released into the system to function in its desired manner. Release of the active agent from the molecular sieve carrier is usually accomplished by the action of heat, although this release may, if desired, be carried out by using another more strongly absorbed material to desorb the active agent.

In accordance with one aspect of the invention, in addition to a chemical-loaded molecular sieve, an activated crystalline zeolitic molecular sieve is also added to the rubber, plastic, resin or adhesive formulation, the molecular sieve acting as an adsorbent to reduce undesirable moisture to a very low concentration and, if required, to further withhold this moisture even at relatively high processing temperatures. Thus, this moisture is prevented from displacing the active agent from the chemical-loaded molecular sieve and the advantages of the latent chemical agent process are thereby maintained.

Because activated crystalline zeolitic molecular sieves will only accommodate molecules having a critical dimension smaller than the apparent pore size of the molecular sieve, a preferred form of the invention consists of a chemical-loaded molecular sieve, and a relatively small-pore, activated molecular sieve as the adsorbent contained in a curable elastomer or resin formulation. Critical molecular dimension is defined as the diameter of the smallest cylinder which will accommodate a model of the molecule constructed using the best available Van der Waals radii, bond angles, and bond lengths. Because of the incorporation of the second, activated molecular sieve, the moisture or other adsorbable deleterious substance is picked up by this second molecular sieve and is effectively prevented from desorbing or otherwise releasing the active agent from the chemical-loaded molecular sieve.

Although in practicing the invention one should consider the pore size of the activated molecular sieve adsorbent used relative to the critical dimension of the molecule retained by the chemical-loaded molecular sieve, maintenance of such relation between the pore size and critical dimension is not critical for every type of formulation. An essential feature of the invention is the ability of the activated molecular sieve to adsorb and effectively withhold the deleterious substances present in the formulation from further participation. When a relatively large pore activated molecular sieve is used as the adsorbent agent, the relative selectivity of the molecular sieve for the deleterious molecules should be high, otherwise more readily adsorbed materials, such as other active ingredients in the formulation, may be withheld by the molecular sieve.

In the following examples and illustrations of the invented method, reference to the "scorch" characteristic of a material defines a term of the rubber or plastic art indicating that point in the processing of a rubber or plastic formulation at which premature curing of the formulation occurs. The Mooney scorch test is a test for determining the conditions of time and temperature for causing a compounded mixture to scorch or prematurely cure. Mooney scorch time is generally considered as a measure of processing safety in that a relatively long period of time is desirable before scorch or premature vulcanization occurs. It is desirable, in this respect, that the rate of cure should not be adversely affected by the means used to increase the scorch time.

Referring to Table I, there is shown the beneficial effect derived from the use of an activated molecular sieve adsorbent along with a piperidine loaded sieve when the two are combined in a natural rubber tire tread formulation. The results here are best determined by a comparison of values for Mooney scorch time at 250° F.

To summarize the results of Table I, the steady increase of scorch time from 20 minutes to 22.5 and finally 28 minutes indicates a decided improvement as the amount of activated molecular sieve adsorbent is increased.

It is notable from column 2 and column 3 that with the increase in amount of adsorbent material up to 2.0 phr. there is a corresponding increase in scorch time. It should be appreciated in this respect that the amount of activated molecular sieve adsorbent added to the formulation may vary with the amount of water present in the formulation and the circumstances of the particular application.

Referring again to Table I, it is seen that the presence of a molecular sieve adsorbent, while improving the scorch time, causes no appreciable diminution in the other physical properties of the material such as elongation and tensile strength.

*Table I*

SODIUM ZEOLITE A MOLECULAR SIEVE IN A TYPICAL NATURAL RUBBER TIRE TREAD FORMULATION

| Lot No | Recipe (phr.[1]) | | |
|---|---|---|---|
| | 1 | 2 | 3 |
| Compound: | | | |
| Smoked sheet | 100 | 100 | 100 |
| Philblack O | 50 | 50 | 50 |
| Zinc oxide | 5.0 | 5.0 | 5.0 |
| Stearic acid | 2.0 | 2.0 | 2.0 |
| Sulfur | 2.0 | 2.0 | 2.0 |
| Antioxidant | 1.0 | 1.0 | 1.0 |
| NOBS [2] | 1.0 | 1.0 | 1.0 |
| CW-1015 [3] | 1.0 | 1.0 | 1.0 |
| Activated sodium zeolite A | | 1.0 | 2.0 |
| Mooney scorch, minutes to 5-point rise: | | | |
| 250° F | 20 | 22.5 | 28 |
| Stress at 300% elongation, p.s.i.: | | | |
| Minutes at 307° F.— | | | |
| 3 | 1,385 | 1,481 | 1,076 |
| 5 | 2,359 | 2,491 | 2,372 |
| 7 | 2,795 | 2,864 | 2,819 |
| Ultimate tensile, p.s.i.: | | | |
| Minutes at 307° F.— | | | |
| 3 | 2,077 | 2,000 | 1,563 |
| 5 | 3,487 | 3,497 | 3,256 |
| 7 | 3,744 | 3,605 | 3,707 |
| Ultimate elongation, percent: | | | |
| Minutes at 307° F.— | | | |
| 3 | 440 | 400 | 400 |
| 5 | 460 | 440 | 415 |
| 7 | 425 | 400 | 425 |

[1] Parts per hundred parts of rubber.
[2] N-oxydiethylene benzothiazole sulfenamide.
[3] Piperidine-loaded sodium zeolite X.

In another embodiment of the invention, as applied to the processing of neoprene rubber, a pyrocatechol-loaded molecular sieve was used as an accelerator in the vulcanization of W type neoprene rubber. Because this accelerating agent is sensitive to moisture, relatively short Mooney scorch times are obtained when it is used in formulations containing residual moisture.

To summarize the data obtained using a black neoprene W formulation as the basic ingredient, reference is made to Table II. Column 1 illustrates the case wherein no attempt was made to remove residual water, the addition of a pyrocatechol-loaded molecular sieve produced a rapid cure and a relatively short scorch time (12.5 minutes).

Addition of the activated adsorbent molecular sieve material (col. 3), prior to the addition of said loaded sieve in the preferred manner of the invention, resulted in a substantial improvement in processing safety, i.e., scorch time increased from 12.5 to 34 minutes.

When both accelerator and scavenging molecular sieves were added simultaneously (col. 2) there is noted a lesser improvement in scorch time, i.e., 12.5 to 21 minutes. Thus, it is seen that, whenever a pyrocatechol-loaded molecular sieve is used and it does not perform as expected under controlled condition, prior addition of a suitable activated molecular sieve will pick up any moisture from the system. Subsequent addition of the accelerating agent will then give a safe processing stock with a rapid rate of cure. It is again emphasized that molecular sieve powders do not affect the rate of cure or the physical properties of the vulcanizate.

*Table II*

SODIUM ZEOLITE A MOLECULAR SIEVE IN A TYPICAL NEOPRENE FORMULATION

| Lot No | Recipe (phr.[1]) | | |
|---|---|---|---|
| | 1 | 2 | 3 |
| Compound: | | | |
| Neoprene W | 100 | 100 | 100 |
| SRF black | 30 | 30 | 30 |
| Neozone A | 1.0 | 1.0 | 1.0 |
| Stearic acid | 0.5 | 0.5 | 0.5 |
| Zinc oxide | 5.0 | 5.0 | 5.0 |
| Magnesium oxide | 2.0 | 2.0 | 2.0 |
| CW-3010 [4] | 2.0 | 2.0 | 2.0 |
| Activated sodium zeolite A | | [2] 2.5 | [3] 2.5 |
| Mooney scorch, minutes to 5-point rise: | | | |
| 250° F | 12.5 | 21 | 34 |
| Stress at 300% elongation, p.s.i.: Minutes at 307° F.— | | | |
| 5 | | 1,115 | 1,158 |
| 7 | | 1,085 | 1,211 |
| 10 | | 1,128 | 1,219 |
| Ultimate tensile, p.s.i.: Minutes at 307° F.— | | | |
| 5 | | 2,805 | 2,947 |
| 7 | | 2,760 | 2,842 |
| 10 | | 2,769 | 2,850 |
| Ultimate elongation, percent: Minutes at 307° F.— | | | |
| 5 | | 625 | 640 |
| 7 | | 585 | 610 |
| 10 | | 585 | 595 |

[1] Parts per hundred parts of rubber.
[2] Sodium zeolite A molecular sieve added simultaneously with CW-3010.
[3] Sodium zeolite A molecular sieve added prior to addition of CW-3010.
[4] Pyrocatechol-loaded sodium zeolite X molecular sieve.

In a further example of the invention, nitrile rubber was utilized as the basic mixture in a series of tests, the results of which are tabulated in Table III. Nitrile rubber formulations have relatively high heat buildup during milling and sheeting operations and therefore require safe processing accelerators. "Delayed-action" primary accelerators such as N-oxy-diethylene benzothiazole sulfenamide give a satisfactory level of processing safety, but a somewhat low rate of cure. It has been found that by suitable utilization of loaded and activated molecular sieves in accordance with the invention, a satisfactory level of processing safety is obtained while the cure rate remains unaffected.

The present example includes the addition of a piperidine-loaded molecular sieve to the nitrile rubber formulation as the accelerator material. It has been found that the piperidine contained in such a molecular sieve will not be desorbed therefrom at a temperature less than 250° F. (the present standard for determination of Mooney scorch time). Referring to col. 2 of Table III, it is seen that the addition of 2.0 phr. of a piperidine-loaded molecular sieve results in a depressed scorch time of 32 minutes; the combination of circumstances indicating a premature displacement of accelerator from the molecular sieve carrier by contained moisture.

*Table III*

SODIUM ZEOLITE A MOLECULAR SIEVE IN A TYPICAL NITRILE RUBBER FORMULATION

| Lot No | Recipe (phr.) [3] | | | | |
|---|---|---|---|---|---|
| | 1 | 2 | 3 | 4 | 5 |
| Compound: | | | | | |
| NBR | 100 | 100 | 100 | 100 | 100 |
| SRF black | 65 | 65 | 65 | 65 | 65 |
| Plasticizer | 15 | 15 | 15 | 15 | 15 |
| Zinc oxide | 5.0 | 5.0 | 5.0 | 5.0 | 5.0 |
| Stearic acid | 2.0 | 2.0 | 2.0 | 2.0 | 2.0 |
| Antioxidant | 1.0 | 1.0 | 1.0 | 1.0 | 1.0 |
| Sulfur | 2.0 | 2.0 | 2.0 | 2.0 | 2.0 |
| NOBS [1] | 1.0 | 1.0 | 1.0 | 1.0 | 1.0 |
| CW-1015 [2] | | 2.0 | 1.0 | 1.0 | 1.0 |
| Activated sodium zeolite A | 1.0 | | 1.0 | 2.0 | 3.0 |
| Mooney scorch, minutes to 5-point rise: | | | | | |
| 250° F | 44 | 32 | 34 | 41 | 43 |
| Stress at 300% elongation, p.s.i.: Minutes at 307° F.— | | | | | |
| 5 | [4] | 1,133 | 1,132 | 707 | 854 |
| 7 | 1,276 | 2,053 | 1,656 | 1,512 | 1,548 |
| 10 | 1,744 | 2,162 | 1,818 | 1,656 | 1,811 |
| Ultimate tensile, p.s.i.: Minutes at 307° F.— | | | | | |
| 5 | [4] | 2,347 | 2,027 | 1,210 | 1,366 |
| 7 | 2,274 | 2,370 | 2,344 | 2,293 | 2,290 |
| 10 | 2,513 | 2,350 | 2,494 | 2,410 | 2,300 |
| Ultimate elongation, percent: Minutes at 307° F.— | | | | | |
| 5 | [4] | 600 | 600 | 550 | 525 |
| 7 | 600 | 390 | 500 | 510 | 500 |
| 10 | 510 | 325 | 450 | 490 | 425 |

[1] N-oxydiethylene benzothiazole sulfenamide.
[2] Piperidine-loaded sodium zeolite X.
[3] Parts per hundred parts of rubber.
[4] No cure.

As additional amounts of activated molecular sieve adsorbents are employed in conjunction with the chemical-loaded molecular sieve (cols. 3, 4, and 5), the scorch time is correspondingly increased from 34 to 43 minutes. This would clearly indicate the function of the activated molecular sieve, i.e., adsorbing and retaining residual moisture to preclude a premature displacement of accelerator material.

From the foregoing results, it is entirely reasonable to expect that other rubber formulations containing polymerized copolymers of high butadiene and low styrene content but containing a certain amount of residual water, will produce the same result.

As stated hereinabove, the method of the invention is also applicable to the rubber industry for processes wherein fabrics are incorporated into the formulation by spreading the rubber compound onto fabrics, as in the manufacture of hose or belting; these processes are known as "frictioning" operations.

Fabric which is used in frictioning operations must be carefully dried or otherwise treated in order to avoid external blisters and/or internal cavities in the final product. This blistering or cavity formation is caused by vaporization of the residual moisture and/or other substances from the fabric during the curing operation. In commercial practice, the fabric drying or treating operation, its control, and the apparatus therefor, are items of considerable expense. It has been found extremely difficult to completely remove all moisture and/or other unwanted vaporizable substances from the fabric, so that blistering and cavity formation remain a problem.

In overcoming this obstacle, it has been found that the addition of a suitable activated molecular sieve to the rubber formation prior to compounding, effectively eliminates blistering and cavities caused by residual moisture.

For instance, using a fabric predried by a conventional drying operation, incorporation of an activated molecular sieve in the formulation will prevent blisters or cavities caused by moisture picked up by the fabric between the time the fabric is dried and the time it is used. In some cases, it is even possible to eliminate the predrying of the fabric and use it as received. A sufficient amount of activated molecular sieve adsorbent agent must, of course, be used in the frictioning compound to effectively adsorb practically all of the moisture or other vaporizable material.

The effectiveness of a molecular sieve in preventing blistering is illustrated by the following experiment: A piece of fabric which was moistened with atomized water was frictioned with two neoprene formulations. Both formulations were the same except that one contained about 10 phr. (parts per hundred parts of rubber) of activated crystalline zeolitic molecular sieve powder. The frictioned fabric, approximately 18 square inches in area, was covered and vulcanized in the conventional manner. On examination, the final product which contained both the frictioning compound and molecular sieve powder was found to be completely free of blisters. The control sample, however, was noticeably marred by the presence of blisters over the entire area.

The process taught by the invention is also useful in resin and plastic formulations where residual water or other substances are detrimental to the curing or polymerizing or storage stability of the material. As with rubber formulation, water or moisture which is present in resin or plastic formulation tends to displace and release the catalyst from the chemical-loaded molecular sieve, thus causing premature curing, setting or polymerization of the resin or plastic material.

For example, the presence of water in a peroxide-catalyzed thermosetting resin system such as the dimethylacrylate ester of polyethylene glycol, poses considerable difficulties. This diester can ordinarily be polymerized with heat and catalyst to a dry, hard composition. It is compatible with polyvinyl chloride resins to give unusual hardness and strength to a cured plastisol. One of the problems encountered by plastisol formulators is the maintenance of "pot-life" or storage stability at or near room temperatures of plastisols containing this polymerizable diester with peroxide catalyst present. It has been found that this storage stability can be extended when molecular sieves are used as latent catalyst carriers in this system, provided any residual water does not displace the di-tertiarybutyl peroxide from the catalyst carrying sieve. Addition of another activated molecular sieve will take up this residual water and thus allow the maximum storage stability to be maintained.

In a similar manner, molecular sieves are useful in preventing premature release of catalyst from an ammonia-loaded molecular sieve, and piperidine- or other amine-loaded molecular sieves used in the hardening or curing of epoxy resins. The curing of these resins is usually conducted at temperatures of 130–200° C., where desiccants like silica gel and alumina have little or no capacity for water, but at which temperatures the molecular sieve adsorbents still retain good capacity for residual water.

A further embodiment of the invention resides in making polyurethane (isocyanate) resins. In making cellular (foamed) structures the presence of water here provides unstable urethane linkages which release carbon dioxide to form urea linkages; the $CO_2$ thus formed creates the desired cellular structure. However, where a dense, noncellular resin product is required, as for certain molded objects and for coating, water is undesirable; here a moisture-withholding substance in the form of an activated crystalline zeolitic molecular sieve powder is quite useful.

In natural or synthetic oil-based paints, in lacquers, or in any other type of coating material where the presence of residual moisture is deleterious to the properties of the formulation during its compounding and/or to the properties of the applied coating, molecular sieves find utility in taking up and withholding this moisture.

In adhesive formulations, especially where they are heated at relatively elevated temperatures to develop maximum bond strengths, for example, in bonding metals used in automotive and aircraft components, the presence or formation of vaporizable constituents can cause pits or voids in the resulting bonding layer; such cavities promote failure of the bond. Water is one of the common deleterious substances found in these adhesive formulations. Incorporation of an activated crystalline zeolitic molecular sieve in accordance with the process of this invention is highly effective in counteracting the harmful effect of the water.

The adsorbents useful in the practice of this invention are preferably those activated synthetic and natural crystalline aluminosilicates of the molecular sieve type having pores of such a size that will permit adsorption of molecules of the undesirable material. The molecular sieve must be structurally stable at the temperatures usually employed in processing rubber and plastic formulations. Molecular sieve adsorbents having pores capable of accepting larger molecules are also useful for adsorbing water and other materials from rubber and plastic formulation in the practice of this invention, providing the molecular sieve adsorbent chosen has a strong adsorption selectivity for the molecular or molecules to be removed. Preferably, the activated molecular sieve adsorbent is added to the formulation before adding the chemical-loaded molecular sieve.

Referring to Table IV, the tabulations shown indicate the diverse results obtained from adding various adsorbent materials to a typical neoprene type W formulation having the following composition:

|  | Phr. |
|---|---|
| Neoprene W | 100 |
| SRF black | 30 |
| Stearic acid | 0.5 |
| Zinc oxide | 5.0 |
| Magnesium oxide | 2.0 |
| Pyrocatechol-loaded molecular sieve | 2.0 |
| Neozone A | 1.0 |

Tests 2 to 13 include the addition of an activated natural or synthetic crystalline zeolitic adsorbent, and tests 14 to 18 employ ordinary adsorbent materials.

An evaluation of Table IV clearly indicates that all of the crystalline molecular sieve types tested improved the scorch characteristics of the formulation by factors ranging from over two to over five, compared with the scorch time exhibited by the basic (control) formulation containing no activated molecular sieve as the adsorbent. At the same time, cure rate characteristics were maintained. The largest improvement factors were attained with the three type A zeolites (Tests 2, 3 and 4), probably because of their relatively large and tenacious capacities for water adsorption at the temperatures involved.

The data of Table IV further indicate that little or no increase in scorch time over that of the control formulation was obtained when silica gel, activated carbon, activated alumina, an amorphous zeolite and an attapulgite-type clay were added to the basic formulation.

Of the synthetic molecular sieves, the preferred materials for the practice of this invention are potassium zeolite A, sodium zeolite A, calcium zeolite A, zeolite B and zeolite T. Of the synthetic molecular sieves type X, L, S, R, D, Z, W and KG may also be used. Of the naturally-occurring molecular sieves, the preferred materials for the practice of this invention are erionite, chabazite, clinoptilolite, mordenite and analcite. Gmelinite, harmotone, phillipsite, faujasite and herschelite may also be used.

Referring to the data of Example I shown below, there is indicated the comparative effects derived from the addition of various activated molecular sieve zeolites as adsorbent agents in a typical neoprene rubber formulation. It is noted that batches 2, 3 and 4, all of which included a molecular sieve adsorbent, showed increases in scorch time ranging from 7.5 to 18.5 minutes as contrasted with batch 1 which contained no molecular sieve adsorbent.

Table IV
EFFECT OF VARIOUS ADSORBENTS ON PERFORMANCE OF PYROCATECHOL-LOADED MOLECULAR SIEVES IN A NEOPRENE W FORMULATION

| Test No. | Adsorbent | Adsorbent, phr.[1] | Mooney scorch at 250° F. (minutes) | Cure—Stress at 300% Elongation (p.s.i.) | | |
|---|---|---|---|---|---|---|
| | | | | 5 min. | 7 min. | 10 min. |
| 1 | None | | 7 | 1,235 | 1,238 | 1,265 |
| 2 | Potassium zeolite A | 2.0 | 28 | 988 | 1,039 | 1,039 |
| 3 | ...do | 3.0 | 33 | 923 | 923 | 935 |
| 4 | Sodium zeolite A | 2.0 | 35 | 1,026 | 974 | 1,020 |
| 5 | Calcium zeolite A | 2.0 | 27 | 927 | 1,000 | 1,000 |
| 6 | Erionite | 2.0 | 20 | 1,150 | 1,200 | 1,100 |
| 7 | ...do | 4.0 | 25 | 923 | 962 | 1,053 |
| 8 | Synthetic mordinite | 2.0 | 17 | 1,122 | 1,220 | 1,253 |
| 9 | ...do | 3.0 | 16 | 1,083 | 1,179 | 1,333 |
| 10 | Natural chabazite | 2.0 | 19 | 1,163 | 1,100 | 1,091 |
| 11 | Clinoptilolite | 2.0 | 19 | 1,086 | 1,200 | 1,256 |
| 12 | Calcium zeolite X | 2.0 | 19.5 | 916 | 1,013 | 1,000 |
| 13 | Sodium zeolite X | 2.0 | 21.5 | 962 | 987 | 1,026 |
| 14 | Silica gel | 2.0 | 7.5 | 1,073 | 1,067 | 1,230 |
| 15 | Activated carbon | 2.0 | 9.5 | 1,048 | 1,095 | 1,172 |
| 16 | Activated alumina | 2.0 | 6.5 | 1,011 | 966 | 1,255 |
| 17 | Zeolex-20 | 2.0 | 10 | 987 | 1,013 | 1,211 |
| 18 | "Permagel" clay | 2.0 | 3 | 874 | 988 | 1,060 |

[1] Parts per hundred parts of rubber.

EXAMPLE I

A neoprene rubber formulation was made up according to the following recipe with the variations as shown.

These four batches were compounded on a laboratory 2-roll mill according to the ASTM standard mixing procedure (reference: ASTM Standards on Rubber Products D-15-55T). After mixing, the samples were removed from the roll mill in a sheet and samples cut for determination of Mooney scorch time at 250° F. This measurement was conducted according to ASTM Standards on Rubber Products D-927-55T.

The physical properties of the vulcanized products were obtained by curing 6" x 0.075" slabs of rubber in a standard test mold at 307° F. for measured periods of time. The tensile tests were conducted according to ASTM Standards on Rubber Products D-412-51T. Results of these measurements on samples from the four batches are as follows:

| Lot No. | Recipe (phr.) | | | |
|---|---|---|---|---|
| | 1 | 2 | 3 | 4 |
| Compound: | | | | |
| Neoprene W | 100 | 100 | 100 | 100 |
| SRF black | 30 | 30 | 30 | 30 |
| Neozone A | 1.0 | 1.0 | 1.0 | 1.0 |
| Stearic acid | 0.5 | 0.5 | 0.5 | 0.5 |
| Zinc oxide | 5.0 | 5.0 | 5.0 | 5.0 |
| Magnesium oxide | 2.0 | 2.0 | 2.0 | 2.0 |
| CW-3010, catechol-loaded (1,2 dihydroxy benzene) sodium zeolite X | 2.0 | 2.0 | 2.0 | 2.0 |
| Activated sodium zeolite A | | 2.0 | | |
| Activated calcium zeolite A | | | 2.0 | |
| Erionite | | | | 2.0 |
| Mooney scorch, minutes to 5-point rise: 250° F. | 12.5 | 31 | 22 | 20 |
| Stress at 300% elongation, p.s.i.: Minutes at 307° F.— | | | | |
| 5 | 916 | 1,015 | 1,150 | 1,150 |
| 7 | 1,165 | 1,025 | 1,114 | 1,200 |
| 10 | 1,098 | 1,175 | 1,100 | 1,100 |
| Ultimate tensile, p.s.i.: Minutes at 307° F.— | | | | |
| 5 | 3,085 | 3,026 | 3,000 | 2,940 |
| 7 | 3,086 | 2,975 | 2,987 | 3,000 |
| 10 | 3,115 | 3,000 | 2,900 | 2,875 |
| Ultimate elongation, percent: Minutes at 307° F.— | | | | |
| 5 | 680 | 570 | 660 | 650 |
| 7 | 625 | 660 | 650 | 610 |
| 10 | 620 | 630 | 620 | 585 |

As is shown, the activated molecular sieve adsorbents added to Lots 2, 3 and 4, particularly type A (Lot 2), produced substantial improvements in scorch time compared with that of Lot 1. At the same time, high rates of cure were maintained.

The method of the invention also finds utility by its employment in certain resin systems wherein chemical changes may take place in the product due to the action of light, heat or gases in the atmosphere. These changes may take the form of a change in dimension or color as a result of degradation and evolution of one or more products of such degradation. It has been found that molecular sieves can take up at least some of these degradation products, when the activated molecular sieve is incorporated into the resin system. For example, when heated or exposed to sunlight, polyvinyl chloride resins are known to discolor badly. This discoloration is accelerated by the release of HCl from the resin.

Sodium zeolite A or other activated molecular sieve has been found to be useful as a heat stabilizer in polyvinyl chloride. Table V shows that in the absence of a stabilizer (Batch No. 1) a polyvinyl chloride plastisol discolors rapidly at 150° C. Using the "time to discolor" as a measure of efficiency, incorporation of activated sodium A molecular sieve is (Batch Nos. 3 and 4) seen to give a rate comparable to that obtained with a conventional stabilizer material, dibutyl tin dilaurate (Batch No. 2).

Table V

| Batch No. | Recipe (phr.) | | | |
|---|---|---|---|---|
| | 1 | 2 | 3 | 4 |
| Compound: | | | | |
| Polyvinyl chloride resin | 100 | 100 | 100 | 100 |
| Dioctylphthalate | 30 | 30 | 30 | 30 |
| Monomer MG-1 [1] | 30 | 30 | 30 | 30 |
| Luperco ATC [2] | 0.6 | 0.6 | 0.6 | 0.6 |
| Dibutyl tin dilaurate | | 2.0 | | |
| Type A Powder [4] | | | 5.0 | 10.0 |
| Time to discolor,[3] minutes: 150° F | 10 | 50 | 30 | 50 |

[1] Monomer MG-1 = Dimethylacrylate ester of polyethylene glycol 200.
[2] Luperco ATC = 50% benzoyl peroxide in tricresyl phosphate.
[3] Specimen was assumed discolored when it became tan in color.
[4] Sodium zeolite A molecular sieve.

Hydrogen sulfide and mercaptans are known to accelerate the degradation of polysulfide polymers. Molecular sieves such as sodium zeolite A and calcium zeolite A have good capacity for these sulfur-containing compounds even at elevated temperatures. Polysulfide polymers can therefore be stabilized by incorporation of a molecular sieve such as sodium A or calcium in the formulation to withhold from the polymer these undesirable degradation products.

The crystalline zeolitic molecular sieves used in carrying out the invention are preferably in an activated state; that is, they should have essentially all the water removed from the pores of the zeolite in order to obtain the maximum advantage of this invention. The activation may be conveniently carried out by heating the zeolite under reduced pressure until the water is removed. The temperature required depends upon the properties of the particular zeolite. In general, a crystalline zeolitic molecular sieve is considered activated when it contains less water than its saturation value and preferably less than about 5% water by weight.

What is claimed is:

1. In a process for compounding rubber formulations at elevated temperature including a mixture of ingredients, an amount of residual moisture and a curing accelerator contained within the pores of a first crystalline zeolitic molecular sieve, the improvement therewith of adding to said mixture during the compounding thereof an activated second crystalline zeolitic molecular sieve having pores sufficiently large to adsorb the moisture but smaller than the first molecular sieve, and in an amount sufficient to preferentially adsorb and retain substantially all of and only said residual moisture during said compounding, said curing accelerator being released from the first molecular sieve during said compounding.

2. In a process as described in claim 1 wherein the activated second crystalline zeolitic molecular sieve is sodium zeolite A in an amount equal to from 1 to 3 parts per hundred of rubber.

3. A composition of matter comprising heat curable elastomers selected from the group consisting of natural rubber, nitrile rubber and neoprene rubber being capable of forming undesirable vapor during heat curing, a heat curing accelerator contained within the pores of a first crystalline zeolitic molecular sieve and releasable during the heat curing and an activated second zeolitic molecular sieve having small pores sufficiently large to adsorb said undesirable vapor but smaller than the first molecular sieve, and in amount sufficient to preferentially adsorb substantially all of and only said undesirable vapor during heat curing.

4. A composition of matter comprising a heat curable natural rubber being capable of forming undesirable vapor during heat curing, about one part per hundred of rubber of a curing accelerator contained within the pores of a first crystalline zeolitic molecular sieve and an activated second zeolitic molecular sieve in an amount from about 1 to 2 parts per hundred of rubber sufficient to preferentially adsorb substantially all of and only said undesirable vapor during heat curing and having small pores sufficiently large to adsorb said undesirable vapor but smaller than the first molecular sieve.

5. A composition of matter substantially as described in claim 4 where the activated molecular sieve is sodium zeolite A.

6. A composition of matter comprising a heat curable neoprene rubber being capable of forming undesirable vapor during heat curing, about one to two parts per hundred of a curing accelerator contained within the pores of a first synthetic zeolitic molecular sieve and releasable during the heat curing, and an activated second zeolitic molecular sieve in an amount up to about 3 parts per hundred of rubber having pores sufficiently large to adsorb said undesirable vapor but smaller than the first molecular sieve, said amount being sufficient to preferentially adsorb substantially all of and only said undesirable vapor during heat curing.

7. A composition of matter substantially as described in claim 6 where the activated second molecular sieve is sodium zeolite A.

8. A composition of matter comprising a heat curable nitrile rubber being capable of forming undesirable vapor during heat curing, about one to two parts, per hundred of a curing accelerator contained within the pores of a first zeolitic molecular sieve, and an activated second crystalline zeolitic molecular sieve in an amount up to about 3 parts per hundred of rubber having pores sufficiently large to adsorb said undesirable vapor but smaller than the first molecular sieve, said amount being sufficient to preferentially adsorb substantially all of and only said undesirable vapor during heat curing.

9. A composition of matter substantially as described in claim 8 where the activated second molecular sieve is sodium zeolite A.

10. A color stabilized resin composition which comprises a polyvinyl chloride plastisol formulation and activated zeolite A molecular sieve material in an amount from 5 to 10 parts per hundred of plastisol.

11. A color stabilized resin as described in claim 10 wherein the activated molecular sieve is sodium zeolite A.

12. Method of processing rubber compositions containing residual moisture, and a curing agent dispersed within the pores of a first crystalline zeolitic molecular sieve material which includes, incorporating in said composition prior to the thermal compounding thereof an activated second crystalline zeolitic molecular sieve adsorbent material having pores sufficiently large to adsorb the moisture but smaller than the first molecular sieve, and in sufficient quantity to allow said material to preferentially adsorb and retain substantially all of and only said residual moisture during said compounding, said curing agent being releasable during the compounding.

13. Method of processing as described in claim 12 wherein the second adsorbent material is an activated crystalline zeolitic molecular sieve.

14. Method as described in claim 12 wherein the second adsorbent material is zeolite A.

15. Method of processing plastic compositions containing residual moisture and a latent curing agent, to avoid the premature functioning of said curing agent, comprising adding to said composition prior to the processing thereof an activated zeolite A molecular sieve material in sufficient amount to preferentially adsorb and retain only said residual moisture, and heating said plastic composition to curing temperature while still retaining the residual moisture in the molecular sieve.

16. An improved method for coating a surface with a heat curable composition containing an amount of vaporizable material therein, which comprises the steps of adding to said composition an activated zeolite A molecular sieve material, heating said composition sufficiently to cause vaporization of said vaporizable material, preferentially adsorbing only the so formed vapors within the pores of the activated molecular sieve, then applying the composition to the surface.

References Cited by the Examiner

UNITED STATES PATENTS

| | | | |
|---|---|---|---|
| 2,848,346 | 8/1958 | Bertorelli | 260—746 |
| 2,867,605 | 1/1959 | Safford. | |
| 2,882,243 | 4/1959 | Milton | 252—194 |
| 2,953,543 | 9/1960 | Pike. | |
| 3,036,983 | 5/1962 | O'Connor | 260—41.5 |
| 3,044,254 | 7/1962 | Adelman | 252—194 |

FOREIGN PATENTS

| | | |
|---|---|---|
| 563,517 | 1/1958 | Belgium. |
| 563,518 | 1/1958 | Belgium. |
| 1,143,634 | 2/1963 | Germany. |

OTHER REFERENCES

"Zeolex 20" Technical publication by J. M. Huber Corp., New York, published April 1, 1953, p. 1 and Table A relied on.

MORRIS LIEBMAN, *Primary Examiner.*

MILTON STERMAN, LEON J. BERCOVITZ,
*Examiners.*

ALEXANDER H. BRODMERKEL, R. J. BUTTERMARK, K. B. CLARK, J. S. WALDRON,
*Assistant Examiners.*